Oct. 17, 1944.   E. B. LEAR   2,360,430
DISTRIBUTING VALVE FOR HOISTS
Filed Aug. 17, 1943   3 Sheets-Sheet 1

INVENTOR
EARL B. LEAR
BY
ATTORNEY

Oct. 17, 1944.   E. B. LEAR   2,360,430
DISTRIBUTING VALVE FOR HOISTS
Filed Aug. 17, 1943   3 Sheets-Sheet 2
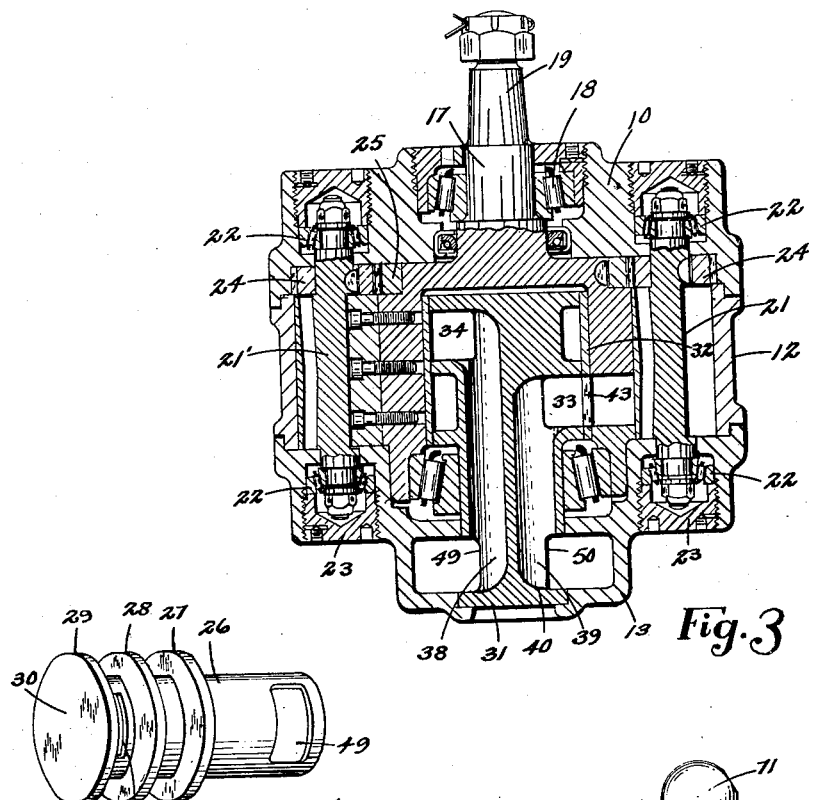
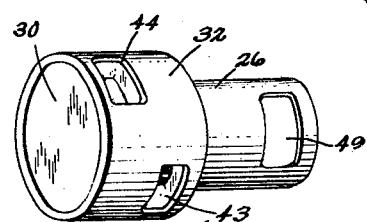
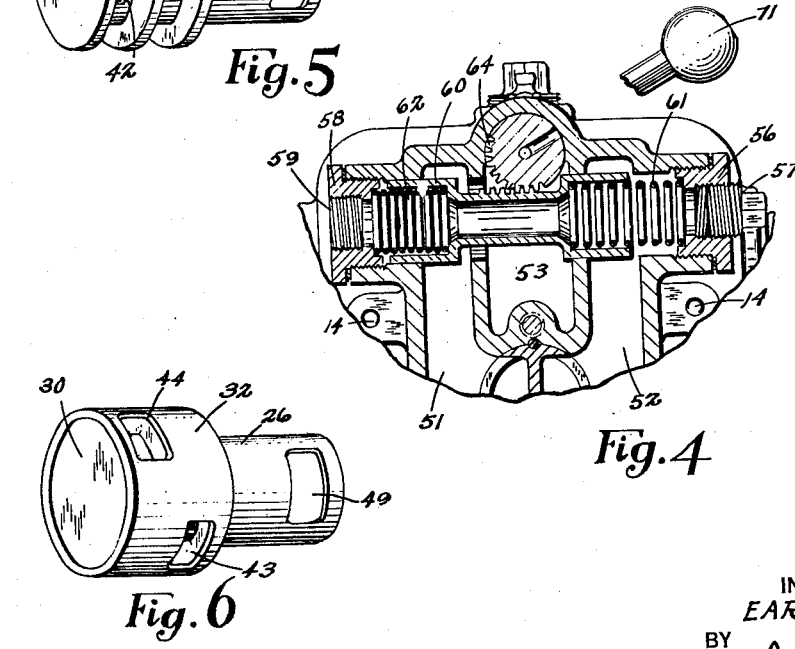
INVENTOR
*EARL B. LEAR*
BY
ATTORNEY Oct. 17, 1944.　　　　E. B. LEAR　　　　2,360,430
DISTRIBUTING VALVE FOR HOISTS
Filed Aug. 17, 1943　　　3 Sheets-Sheet 3

INVENTOR
EARL B. LEAR
BY
ATTORNEY

Patented Oct. 17, 1944

2,360,430

UNITED STATES PATENT OFFICE 2,360,430

DISTRIBUTING VALVE FOR HOISTS

Earl B. Lear, Garfield Heights, Ohio, assignor to The Cleveland Pneumatic Tool Company, Cleveland, Ohio, a corporation of Ohio Application August 17, 1943, Serial No. 499,016

8 Claims. (Cl. 121—71)

This invention relates to improvements in distributor valves for fluid motors.

One of the objects of the invention is the provision of a distributor for a reversible motor adapted to handle the flow of motive fluid in either direction.

Another object is the provision of a distributor valve which may be manufactured at relatively low cost.

A further object is the simplification of structures of the character stated.

Other objects and features of novelty will appear as I proceed with the description of that embodiment of the invention, which, for the purposes of the present application, I have illustrated in the accompanying drawings, in which:

Fig. 3 is a horizontal sectional view taken substantially along the line 3—3 of Fig. 1;

Fig. 4 is a fragmental view corresponding with Fig. 1 but showing a different position of the manual control valve;

Fig. 5 is a detail perspective view of the body member of the distributing valve;

Fig. 6 is a detail perspective view of the complete distributing valve; and

Figure 1:
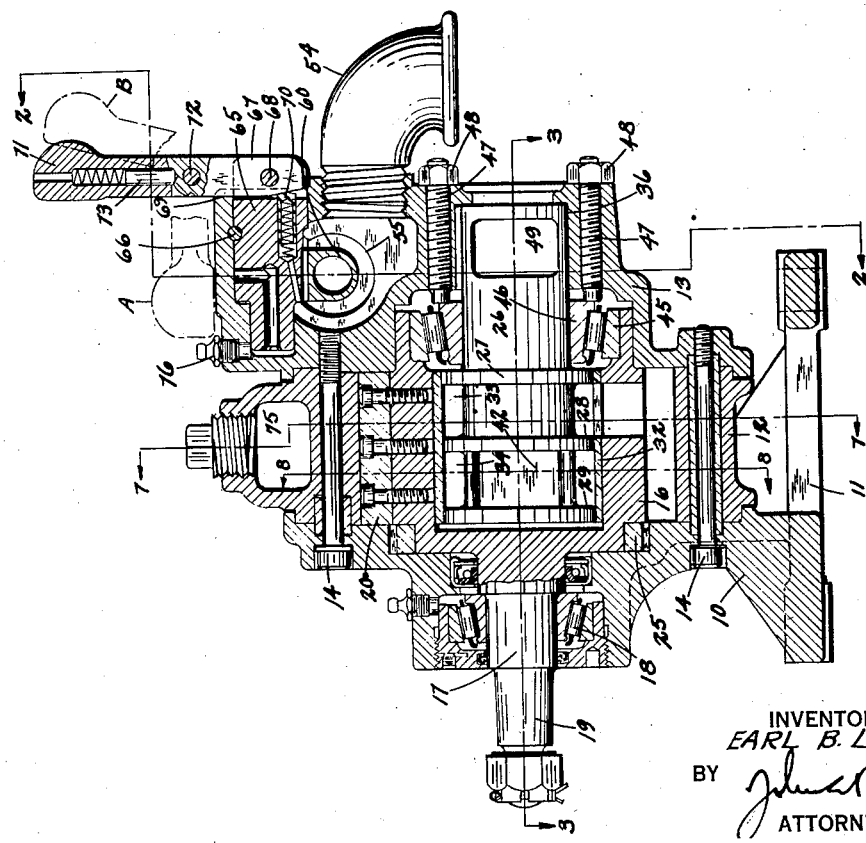
Fig. 1 is an elevational view principally in vertical section through the axis of the motor rotor.
Figure 7:
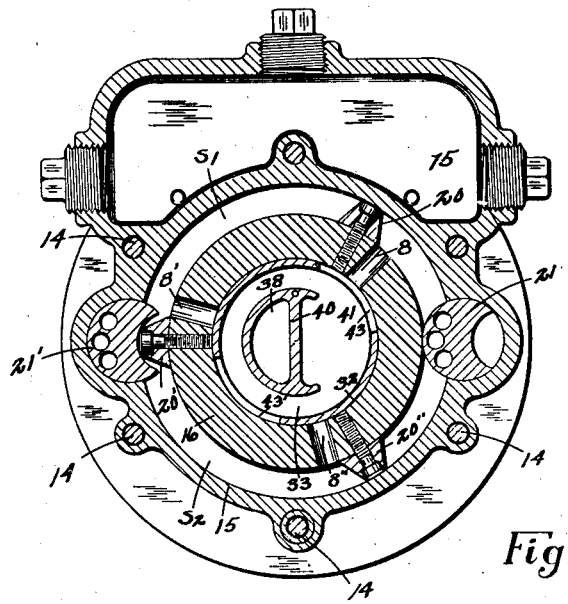
Figure 8:
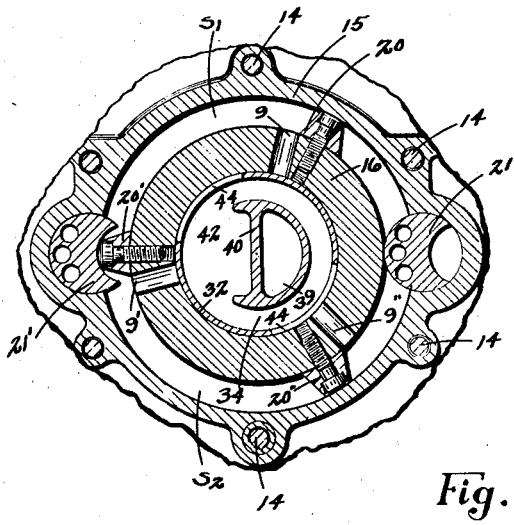

Figs. 7 and 8 are transverse sectional views taken substantially along the lines 7—7 and 8—8 respectively of Fig. 1.

For the purpose of illustrating the invention, I have shown in the drawings a reversible fluid motor adapted for use in operating cable hoists, although the invention is equally applicable to motors designed for other purposes. The casing may comprise one end element 10 with a base 11 integral therewith, a cylindrical element 12 and another end element 13. These three elements are secured together by a series of screws or studs 14. The principal part of the space so enclosed constitutes a housing 15 for the rotor of the motor.

The rotor consists primarily of a cup shaped forging 16 which is formed integral with and supported at one end of shaft 17. The latter has a single anti-friction bearing 18 carried in the end element 10 of the casing, and is provided with a taper portion 19, for the reception of a gear or other driven member. A plurality of longitudinal vanes, three in the illustrated case numbered 20, 20' and 20", are secured to the rotor 16, their peripheries being finished to have a running fit within the housing 15.

Two rotary abutments 21 and 21' disposed diametrically opposite each other are mounted in bearings 22 carried by the end elements 10 and 13 of the casing. The outer races of these bearings are adjusted by hollow plugs 23 that are threaded into tapped openings in the casing, and serve additionally as dust guards. Each of these abutments has keyed thereto a pinion 24 which meshes with a gear 25 that is mounted within a rabbet formed in the rotor 16 to which the gear is keyed or otherwise secured. The gear ratio in the illustrated case is 3 to 1, since there are three vanes and each abutment must make one revolution each time a vane passes it, as is well known in the art. Each abutment is always in engagement with either a vane, as illustrated at the left side of Figs. 7 and 8, or with the periphery of the rotor itself, as illustrated at the right side of the same figures. Thus the cavity between the rotor 16 and the housing 15 is always divided into two semi-cylindrical spaces $S_1$ and $S_2$. Each of these two spaces has pressure and exhaust cycles which take place independently of those in the other space. In the rotor opposite the annular passage 33 there are three radial passages 8, 8' and 8" located adjacent to the vanes 20, 20' and 20". Similar passages 9, 9' and 9" extend through the rotor opposite the annular passage 34, the passages 8, 8' and 8" on the one hand and 9, 9' and 9" on the other hand being located on opposite sides of the corresponding vanes.

The rotor 16 revolves around a distributor valve which is made in two parts. One of these parts, illustrated separately in Fig. 5, is a generally cylindrical body member 26, having three peripheral flanges 27, 28 and 29 spaced apart and finished to the same diameter, flange 29 being flush with the closed end 30 of the member. The opposite end is also preferably closed as indicated at 31 in Fig. 3. A sleeve 32 is fitted tightly upon the flanges 27, 28 and 29, being preferably shrunk onto them. In this manner two annular passages 33, and 34 are formed within the confined of the distributor valve. The outer surface of sleeve 32 is finished to have a running fit within the rotor 16.

The smaller or unflanged end of body member 26 is gripped within a socket 36 in the casing member 13. Preferably this joint is a driven fit. It provides a rigid mounting for the distributor valve and holds it against turning, the latter effect being augmented if desired by a pin 37 taking into half round registering grooves formed in the periphery of the distributor and the wall of the socket 36.

The distributor is generally hollow, and its internal space is divided into two longitudinal passages 38 and 39 by a diametrical partition 40. Annular space 33 is connected with longitudinal passage 39 by a port 41 in the body member, while annular space 34 is similarly connected with longitudinal passage 38 by a port 42 in the body member. Sleeve 32 has two oppositely positioned ports 43 and 43' in communication with annular passage 33, and two oppositely positioned ports 44 and 44' in communication with annular passage 34, the ports 43 and 43' being disposed at right angles to the ports 44, 44'.

The open end of cup shaped rotor 16 carries the outer race 45 of an anti-friction bearing, the inner race 46 of which is mounted on the distributor between flange 27 and that end of the distributor which is gripped by the casing element 13. Adjustment of this bearing is effected by a pair of studs 47 which are threaded in the casing and bear at their inner ends against accidental movement.

Near the outer end of the distributor there are two opposite horizontal ports 49 and 50 communicating with the longitudinal passages 38 and 39 respectively, and connecting these passages with two parallel upwardly extending passages 51 and 52 formed in the end member 13 of the casing. An exhaust chamber 53 positioned between the passages 51 and 52 communicates with atmosphere, preferably through an elbow 54 with a downwardly directed discharge.

There is a transverse bore 55 through the upper end of the casing element 13, closed at one end by a bushing 56 and a threaded plug 57 and having a similar bushing 58 at the opposite end with a threaded opening 59 to receive a pressure fluid conduit, not shown. In the bore 55 there is a slidably mounted hollow elongated valve piece 60 adapted when in the position illustrated in Fig. 1 to close the two passages 51 and 52 against communication with the intake opening 59 as well as with the exhaust chamber 53.

The central portion of valve piece 60 is of constricted cross-section and forms abutments for two coil springs 61 and 62, the opposite ends of which bear against the bushings 56 and 58 respectively, these springs tending to hold the valve piece in its median or closed position. Rack teeth 63 cut into the upper side of the constricted middle part of the valve piece mesh with the teeth of a gear sector 64 constituting an integral part of a rotatable plug 65 which is mounted in a cylindrical socket in the casing member 13 and is locked against axial movement by a pin 66 taking into an arcuate groove formed in the plug.

Plug 65 is adapted to be turned by a lever 67 that is mounted on a pivot 68 which is carried by a pair of ears on the plug. This lever normally fits within a notch 69 formed in the casing element 16 above the plug, the lever being biased toward engagement with this notch by a spring pressed plunger 70. The outer end of the lever may have an extension handle 71 connected therewith by means of a pivot 72, the extension being used in the full line position for operation of the plug 65 and being adapted to be folded down to the broken line position A for the sake of compactness. For releasably holding the handle in either of these positions I provide a spring detent 73 and a pair of cooperating notches spaced 90° apart around the axis of pivot 72. When the valve piece 60 is to be moved the lever 67 and its extension 71 are swung to the broken line position B, forcing the plunger 70 into its socket and disengaging the lever from the notch 69, after which the lever may be swung to turn the plug 65.

A reservoir 75 for lubricating oil may be formed in the top of the intermediate casing element 12 and feed lines, not shown, may extend from this reservoir to bearing surfaces of the motor. 76 is a grease connection of conventional form through which grease may be fed to the bearing surfaces of plug 65.

Figure 2:
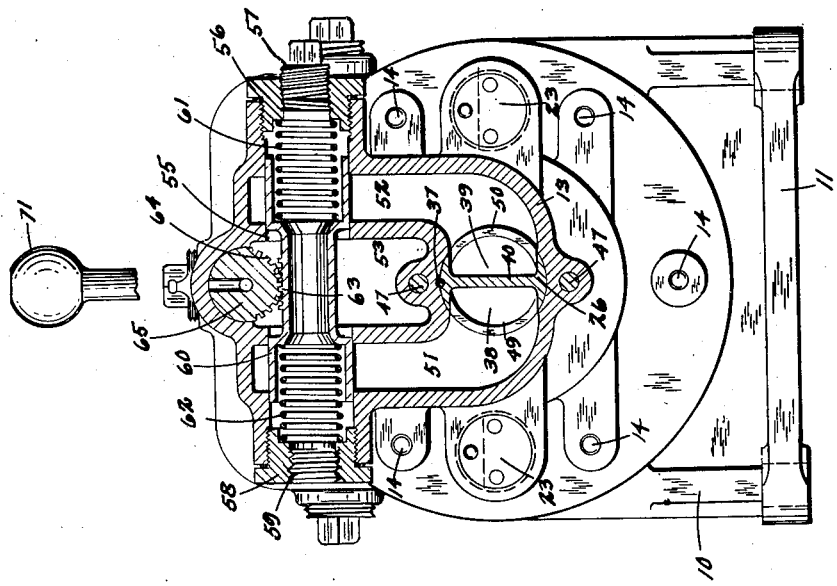
Fig. 2 is a vertical sectional view taken substantially along the line 2—2 of Fig. 1.

*Operation.*—Assuming that the control parts are in the positions illustrated in Fig. 2, and that it is desired to operate the motor, the workmen in charge grips the handle 71, pulls it out to the broken line position B of Fig. 1, and swings it to one side as illustrated in Fig. 4. Pressure fluid then flows from the intake opening 59 entirely through the hollow valve piece into the passage 52, thence through port 50 into longitudinal passage 39, from that passage through port 41 into annular passage 33, and thence through passages 8, 8' and 8" into the cylindrical spaces $S_1$ and $S_2$ between the housing 15 and rotor 16, causing the rotor to turn in the counterclockwise direction as viewed in Fig. 7. One only of the passages 8, 8' and 8" is active at a time because of the location and size of the ports 43, 43' through sleeve 32. At the instant the parts are in the positions illustrated in Figs. 7 and 8, for example, the passage 8 is active and the pressure fluid flowing through it is confined between the abutment 21 and the vane 20. When the passage 8 leaves the port 43 no more pressure fluid is admitted behind vane 20. Immediately thereafter however passage 8' registers with port 43' and thus exerts pressure behind vane 20' in the semi-cylindrical space $S_2$. There is no exhaust of the fluid behind vane 20 until that vane passes abutment 21', whereupon port 9" comes into register with port 44'. The exhaust then enters the annular passage 34 and flows through port 42 into longitudinal passage 38, out through port 49 into passage 51 and then into exhaust chamber 53 and out to atmosphere. In case the operator desires to bring about operation of the motor shaft in the clockwise direction as viewed in Figs. 7 and 8, he throws lever 71 over to the left instead of to the right, which brings about flow of pressure fluid into the passage 51 and exhaust from the passage 52 into chamber 53. Thus flow is reversed throughout the various passages and ports, and rotation is correspondingly reversed.

The body member 26 of the distributor valve is readily and economically made as a casting, and the sleeve 32 when shrunk on to the finished peripheries of flanges 27, 28 and 29 grips the flanges firmly and forms fluid tight joints. The use of the distributor as the mounting for the inner race 46 of one of the rotor bearings, also provides a simplified and economical construction.

In the foregoing description I have necessarily gone somewhat in to detail in order to explain fully the particular embodiment of the invention herein illustrated, but I desire to be understood that such detailed disclosures are not to be construed as amounting to limitations except as they may be included in the appended claims.

Having thus described my invention, I claim:

1. In a distributor valve for a rotary fluid motor, a generally cylindrical body member, a diametrical partition in said body member forming two longitudinal passages, said body member having two distinct annular passages each connected with one only of said longitudinal passages, said body member having peripheral ports adapted to connect each of said annular passages with a motor rotor, one for power fluid and the other for exhaust, and said body member having further ports communicating with said longitudinal passages at points axially removed from said annular passages.

2. In a distributor valve for a rotary fluid motor, a generally cylindrical body member, a diametrical partition in said body member forming two longitudinal passages, three spaced annular flanges on the body member, a sleeve tightly fitted on said flanges forming two annular passages each connected with one only of said longitudinal passages, said sleeve having ports therethrough adapted to bring each of said annular passages into communication with a motor rotor, and said body member having ports communicating with said longitudinal passages at points axially removed from said annular passage.

3. In a distributor valve for a rotary fluid motor, a generally cylindrical body member, a diametrical partition for said body member forming two longitudinal passages, three spaced flanges on the body member finished to the same diameter, a metal sleeve shrunk onto said flanges forming two annular passages, each connected with one only of said longitudinal passages, said sleeve having ports therethrough adapted to bring each of said annular passages into communication with a motor rotor, and said body member having ports communicating with said longitudinal passages at points axially removed from said annular passages.

4. In a rotary fluid motor, a shaft, a cup shaped rotor carried at one end of said shaft, a distributor valve coaxial with said shaft extending into the cavity of said rotor around which the rotor revolves with a running fit, said distributor being supported at its opposite end and fixed against rotation, and a bearing for the open end of said cup shaped rotor mounted upon the distributor, said distributor having inlet and exhaust ports located outwardly of said bearing.

5. In a rotary fluid motor, a shaft, a cup shaped rotor carried at one end of said shaft, an anti-friction bearing for the shaft, a distributor valve coaxial with said shaft extending into the cavity of said rotor and around which the rotor revolves with a running fit, said distributor being supported at its opposite end and fixed against rotation, and an anti-friction bearing for the open end of said cup shaped rotor mounted upon the distributor.

6. In a rotary fluid motor, a casing, a cup shaped rotor mounted to turn in said casing, a fixed generally cylindrical distributor valve extending into the cavity of said rotor and having a running fit therein, said distributor being supported at its opposite end in said casing and having inlet and exhaust ports near the latter end, said casing having parallel intake and exhaust passages in communication with said ports, and common valve means for controlling said passages simultaneously.

7. In a reversible rotary fluid motor, a casing, a cup shaped rotor mounted to turn in said casing, a fixed generally cylindrical distributor valve extending into the cavity of said rotor and having a running fit therewith, said distributor having a diametrical partition providing two longitudinal passages, mounting means in the casing for the outer end of said distributor said distributor at its outer end having a pair of ports connected with said longitudinal passages, said casing having parallel passages connected with said ports, and manually operable valve means for connecting a power fluid supply with either of said last named passages and simultaneously connecting the other of said last named passages with atmosphere.

8. In a reversible rotary fluid motor, a casing having an opening therein forming a cylindrical housing, a cup shaped rotor within said housing, said rotor having a plurality of longitudinal vanes, a rotary abutment in said housing geared to the rotor and formed to clear said vanes as they pass the abutment, a generally cylindrical distributor valve supported and fixed at its outer end in said casing extending into the cavity of said rotor and having a running fit therewith, a diametrical partition in said distributor forming two longitudinal passages, said distributor having two annular passages each connected with one only of said longitudinal passages, said distributor having ports adapted to bring each of said annular passages into communication with the rotor, said rotor having a set of ports on one side of the vanes adapted to communicate with the distributor ports leading to one of said annular passages and having another set of ports on the opposite side of said vanes adapted to communicate with the distributor ports leading to the other of said annular passages, whereby the direction of the motor may be reversed by reversing the direction of flow of fluid through the said longitudinal passages.

EARL B. LEAR.